July 30, 1935.  C. W. GREEN  2,009,581
CASH REGISTER
Filed Nov. 13, 1930   5 Sheets-Sheet 5

INVENTOR.
Charles W. Green
BY
ATTORNEYS.

Patented July 30, 1935

2,009,581

UNITED STATES PATENT OFFICE 2,009,581

CASH REGISTER

Charles W. Green, Ilion, N. Y., assignor, by mesne assignments, to The National Cash Register Company, Dayton, Ohio, a corporation of Maryland Application November 13, 1930, Serial No. 495,334

15 Claims. (Cl. 235—2)

This invention relates to cash registers and analogous devices, particularly to those types of machines wherein records are printed of each individual item entered in the machine and the total of a series of such items; also, to machines wherein printing is effected directly from a totalizer and also from a series of special counters upon a record bearing material so that a complete report of the various transactions effected in the machine is obtained. Machines printing this data have been used to a great extent in chain stores and in the larger business establishments wherein several cash registers are used and operated solely by employees. At the end of the day an auditor or other authorized person will operate the total taking devices to effect printing impressions from the totalizer and special counters and this information is then sent to the main office where it is examined and the daily trend of business as well as the manner in which each machine was operated may readily be determined. In most of the prior constructions the daily report consists merely of the total of the various items entered in the machine and of the total standing on each of the special counters; this information being printed upon a single record material. Some of the prior constructions also contain a separate detail strip upon which is listed only the items entered in the machine for any given period.

The present invention contemplates an improvement over these prior constructions in that both the items as well as the total of said items and the totals standing on each of the several special counters may be printed upon a single record material. This construction obviously has many advantages in that but a single record medium is employed which contains a complete report of the various operations of the machine. When such information appears upon different record media which are printed from different printing mechanisms it is apparent that alterations may be made to cause inconsistencies to result between the various printed records and in that manner render it difficult to obtain a true report of the operations of the machine.

One of the objects of the present invention therefore, is to provide a machine which is capable of printing both the items, the total of said items, and the total standing on a plurality of special counters, upon a single record material.

Another object of the present invention is to provide an interlocking mechanism for compelling a sequence of operation between the printing mechanisms so that printing must be effected from the totalizer before a printing impression can be taken from the special counters.

Another object of this invention is to provide an interlocking mechanism which is so constructed and arranged that printing is compelled from the totalizer and the special counters before resetting of said totalizer and counters can be effected.

Another object of the invention is to provide a single platen which is adapted to effect item printing, printing of a total of the items and also to effect printing of the totals standing on a series of special counters.

Other and further objects will become apparent as the description of the invention progresses.

Reference will now be had to the drawings in which.

Reference to the detailed description which follows and which is divided under suitable headings will give a full understanding of the various features embodied in the present invention and their intended mode of operation.

For the purpose of illustration this invention has been shown as applied to a type of machine the general principle of which is disclosed in copending applications, of Charles W. Green Serial Number 35,599, filed June 8, 1925 (now Patent No. 1,870,004, issued August 2, 1932), and Serial Number 451,245, filed May 10, 1930. However, the invention is applicable to any type of machine, the general principle of which is disclosed in the United States patent to Frederick L. Fuller No. 1,742,701. It is understood, however, that this invention is not limited to this type of machine but may with slight modifications be applied to other well known forms of accounting machines.

Framework

Figure 2:
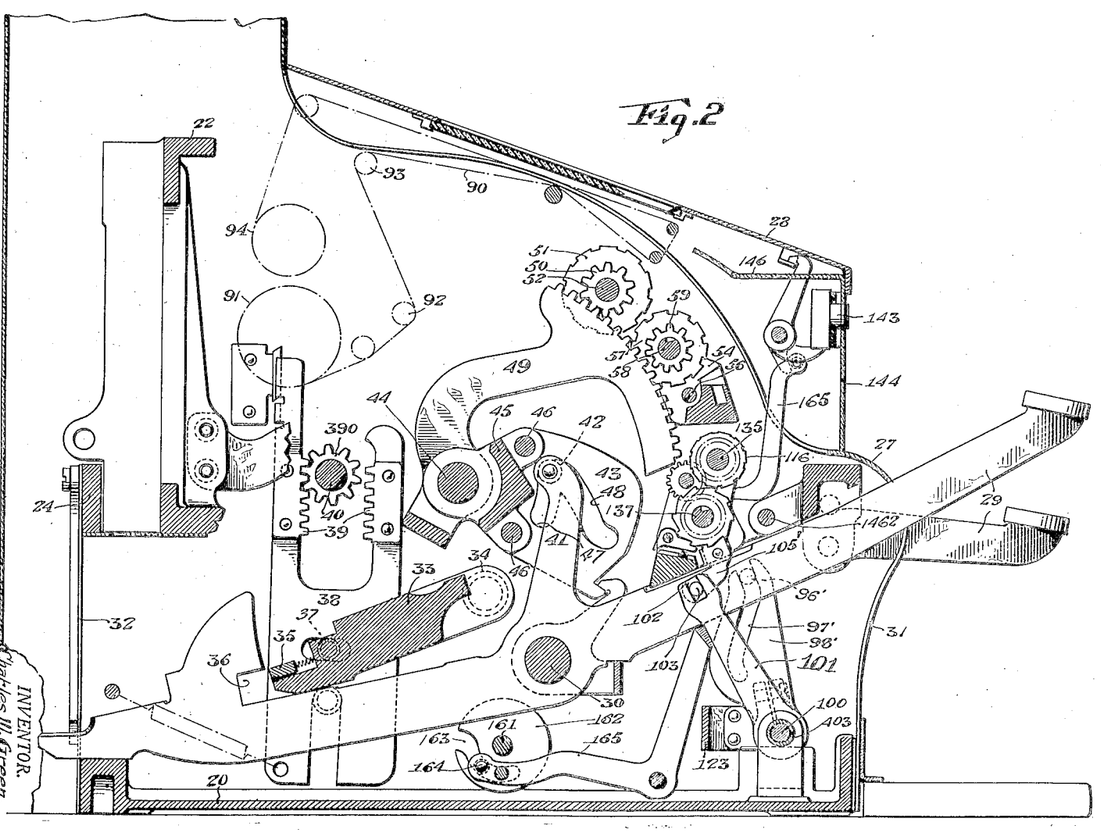
Fig. 2 is a sectional elevational view taken through the machine showing the general arrangement of the various type carriers, the differential mechanism, and the operating keys.
Figures 3, 4, 11, 12, 13:
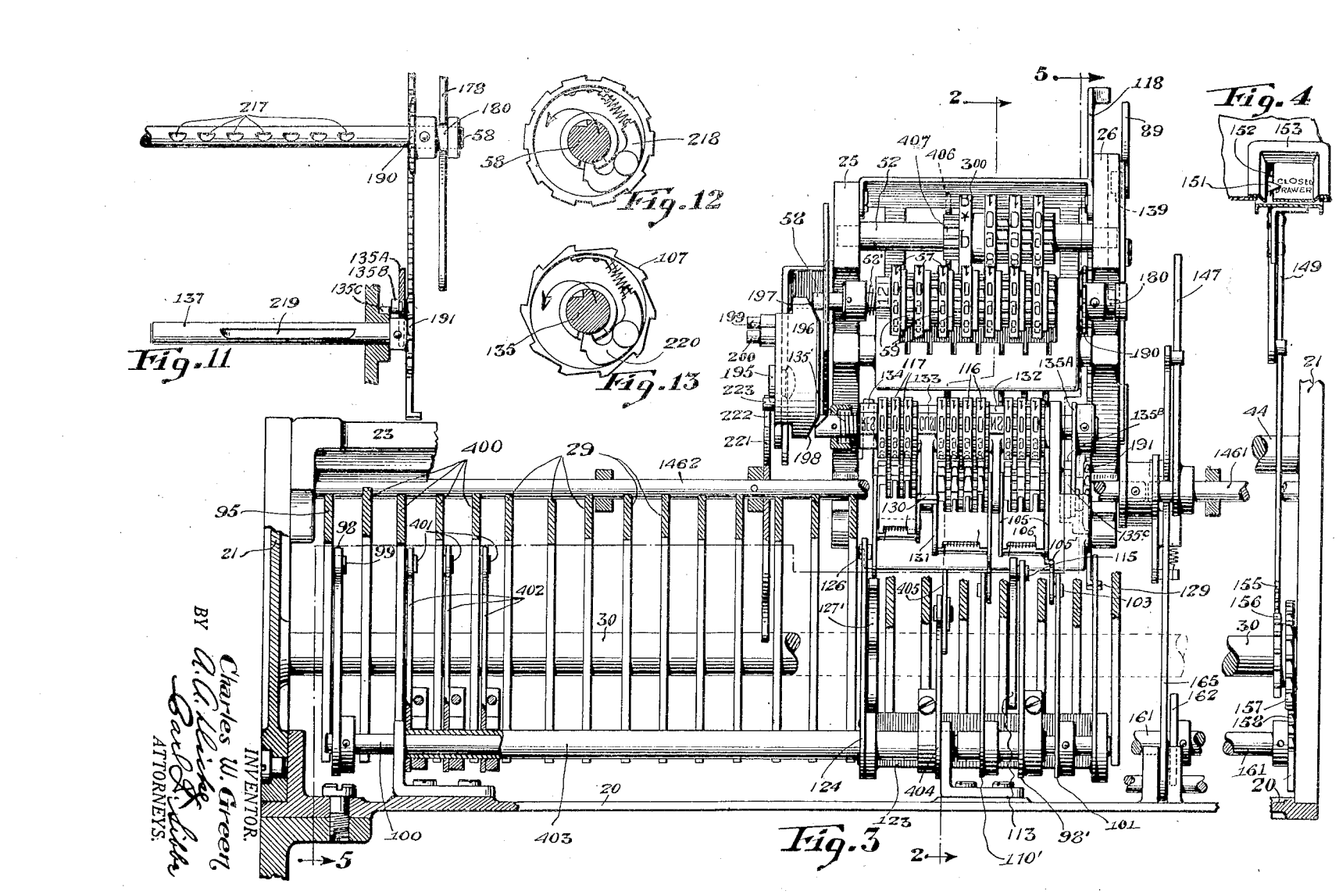
Fig. 3 is a front elevational view showing the arrangement of the item type carriers, the totalizer, and the special counters, and also parts of the operating mechanism for the special counters.
Fig. 4 is an extension of Fig. 3 showing a portion of the control lever.
Fig. 11 is a detail view showing the supporting shafts for the totalizer elements and special counters.
Fig. 12 and Fig. 13 are details of the counter elements showing the pick up pawls for engaging the shaft to return the counter wheels to normal.

The various parts of the mechanism are supported by a suitable framework comprising a base casting 20 (Fig. 2) and suitable side frames 21, shown in Fig. 3. These side frames are connected at their upper rear ends by a framework 22 and cross connections in the form of tie bars 23 and 24 situated between the front and rear of the machine respectively. The machine is also provided with two intermediate and parallel supporting frames 25 and 26. The mechanism is enclosed by a cabinet 27 which has hinged thereto a flat lid 28 so that access may be had to the printing mechanism for replenishing the paper supply and permitting total printing and resetting of the totalizer and counters.

Keys and operating mechanism

The illustrated machine is provided with a number of groups of keys, one group for entering amounts from 1¢ to 9¢, a second group for registering amounts from 10¢ to 90¢, and a third group for amounts ranging from $1.00 to $9.00. Five transaction keys are also provided for registering respectively, cash, charge, paid out, received on account, and no sale transactions. Since the construction and operation of the keys related to the various amount groups are alike, a description of the manner of operation of one of the groups will suffice for all. To this end the operation of the keys related to the dimes group will be given, reference being had particularly to Fig. 2.

The amount keys 29 associated with the dimes bank are pivoted on a shaft 30 extending transversely of the machine and journaled in the side frames. The keys are guided in their reciprocating movement by slots 31 formed in the front part of the cabinet 27 and are furthermore guided at their rearward ends by a vertically slotted plate 32 attached to the tie bar 24 and the base 20. Upon the rear ends of the keys is a key coupler 33 journaled at 34 in the side frames. The key coupler has a nose 35 cooperating at times with notches 36 formed in the rearward ends of the keys 29. When the outer ends of the keys are depressed, the key coupler is rocked clockwise, as viewed in Fig. 2, and the nose enters the notches 36 formed in the rear end of the keys. The purpose of such key coupler mechanism is well known in the art and need not be discussed herein. Connected to the key coupler 33 at 37 is a vertically reciprocating rack plate 38 provided with oppositely facing rack teeth 39 which alternately mesh with a gear 399 fast to a main operating shaft 40 journaled between the machine side frames. The arrangement of this mechanism is such that a reciprocation of the coupler 33 by the keys will effect a complete rotation of the gear and the shaft 40 to which the gear is secured. This shaft 40 is provided with cams or other suitable devices for operating the various parts of the registering and printing mechanisms. Some suitable form of full stroke mechanism to compel a complete operation of the machine when once started may be provided but since mechanisms for accomplishing this function are well known in the art no description thereof is necessary herein. For a full disclosure of such a mechanism reference may be had to the Fuller patent previously mentioned.

Differential mechanism

The differential mechanism or the devices controlled by the various groups of keys for adjusting the item type carriers and actuating the different totalizers are all similar in construction and principle of operation and a description of one will suffice for all.

As best shown in Fig. 2, each of the amount keys 29 is provided with an upwardly extending arm 41 carrying a suitable anti-friction roller 42 cooperating with differential slots formed in cam plates 43. Loosely mounted upon a transverse shaft 44 is a frame 45 provided with spaced slots in which are secured by pins 46 a series of the cam plates 43 one for each key. The cam plates 43 are provided with L-shaped slots 47 and 48, the slots 47 being concentric with respect to the shaft 44. The slots 48 are, however, graduated so that when the roller 42 carried by the arm 41 of a depressed key 29 operates in the slot 48 of its associated cam plate 43 it will move the frame 45 differentially and to an amount commensurate with the value of the key depressed. When, however, the frame 45 is operated by the depression of a key 29 of a certain group the rollers 42 of the undepressed keys of the same group will play in the arcuate slots 47, thereby permitting the frame 45 to be raised differentially without interfering with the rollers 42 of the unoperated keys.

It is to be understood that there is a differential frame for each group of amount keys, and that each frame is similarly constructed so that if three keys relating to the same number of groups are depressed the frames will be operated differentially to amounts commensurate with the values of the keys depressed.

As is best shown in Fig. 2, the differential frame 45 has attached thereto a segmental rack 49. In continuous mesh with the teeth of the segmental rack 49 is a pinion 50 attached to an item type wheel 51 mounted upon a shaft 52 and adapted to print upon a record strip. From the above it will be evident, that since there may be nine keys in a particular group and a corresponding number of cam plates 43, the segmental rack 49 and type carrier 51 may be brought to any one of the nine different positions by the depression of a key 29 associated with such group of keys. In a manner similar to this the keys associated with any of the differential groups will adjust their related type carriers so that when printing is effected the type wheels will print characters corresponding to the value of the keys depressed.

Figures 5, 10:
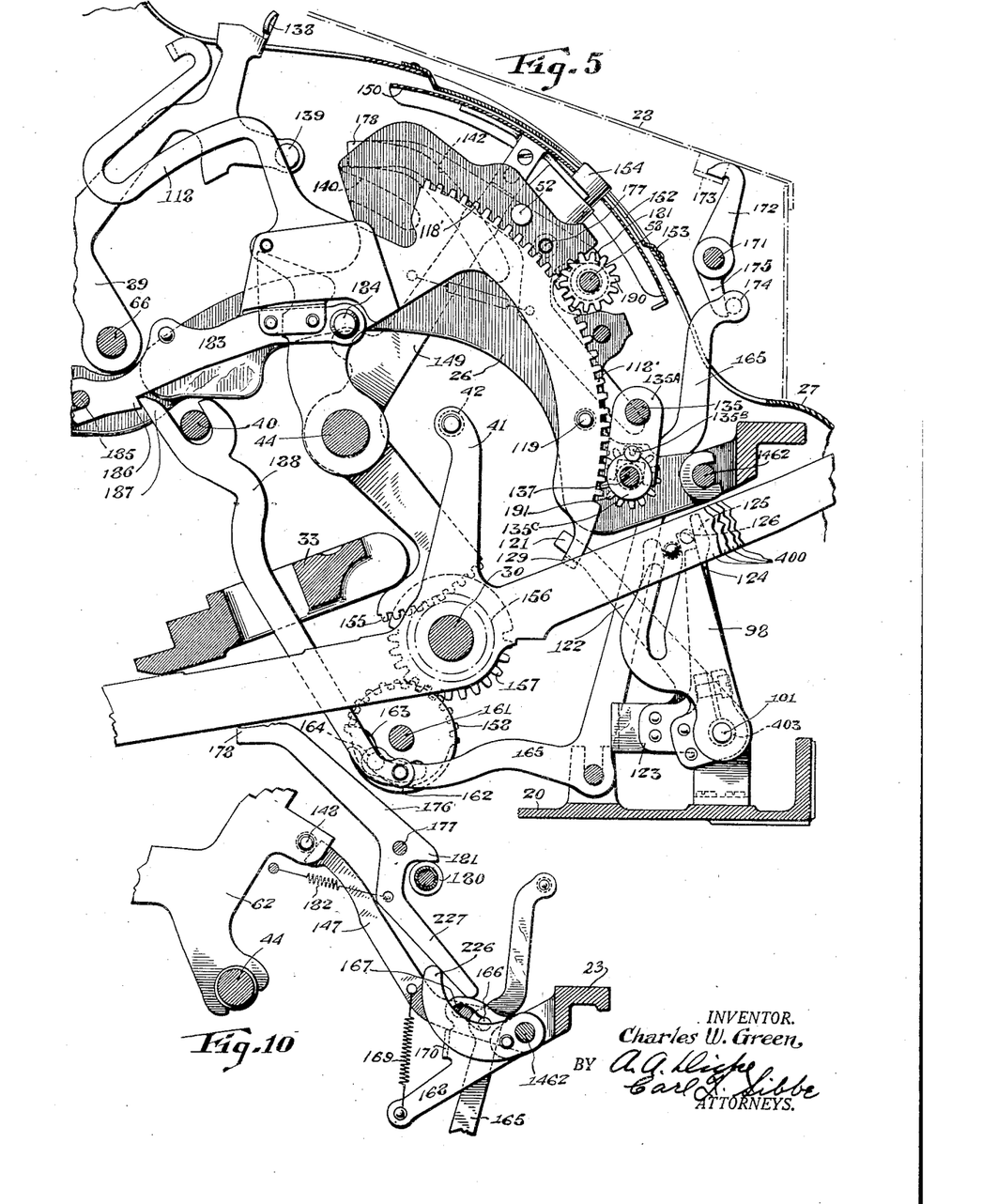
Fig. 5 is a side elevational view taken on line 5—5 of Fig. 3.
Fig. 10 is a detail view of a number of the elements comprised in the interlocking mechanism.

The differential mechanism for adjusting type carrier 300 associated with certain of the transaction keys 400 is shown more clearly in Figs. 3 and 5. A star on the type carrier 300 designates a cash transaction and is normally in printing alignment with the item type carriers. The cash key 400, therefore is not connected with a differential mechanism since it is not necessary to position type carrier 300 to bring a cash designation to the printing line. The paid out, charge and received on account keys 400 each carries a laterally projecting pin 401 which plays in its respective cam plate 402 fast to the long sleeve 403 mounted on shaft 103 extending transversely of the machine. At the right hand end of such sleeve is pinned an arm 404 which is provided with a bifurcation at its upper end for receiving a stud attached to the lower arm 405 of pivotally mounted segment 406, which actuates pinion 407 attached to type wheel 300. The segment 406 is similar to the segment 49, and is free to rock about the shaft 44. The cam plates 402 are similar to the plate 98 shown in Fig. 5. Thus it is clear that when a paid out, charge or received on account key is depressed cams 402 will rock sleeve 403 which in turn will transmit the motion of said key to type carrier 300 thereby bringing the proper character to the printing line.

*Totalizer and totalizer engaging mechanism*

Situated below the type carriers 51 is a pivotally mounted totalizer 54. This form of totalizer is shown in the Fuller patent mentioned hereinbefore and generally in Fig. 2. This totalizer is pivotally mounted at 56 between the intermediate frames 25 and 26. The wheels 57 of the totalizer are mounted upon a shaft 58 journaled in the totalizer frame and the peripheries of the wheels are formed with raised characters so as to effect printing upon a suitable impression material. Attached to the totalizer elements are pinions 59 which are adapted at times to be brought into mesh with the teeth of the segmental rack 49 by rocking the totalizer about its pivot 56. The specific means for rocking the totalizer into engagement with the operating segments 49 is well known in the art and need not be described herein in detail. For a disclosure of a mechanism for accomplishing this function, reference may be had to the Green applications or the Fuller patent previously mentioned. In general terms, however, it may be stated here that the totalizer is brought into engagement with the segments 49 before the latter have been moved by the amount keys 29. During the downward depression of the amount keys, the frames 45 will be operated differentially and by means of the engagement of the totalizer pinions and the operated segmental racks 49, an amount will be inserted in the totalizer commensurate with the value of the key or keys depressed. At the extreme end of the downward stroke or, if desired, during the first part of the upward stroke of the keys, the selected totalizer is disengaged and remains disengaged during the time the keys are returned to their normal position.

*Record strip printing mechanism*

It is desirable each time an item is entered in the machine that its amount as well as a character designating the transaction entered in the machine be printed upon a record strip. The record strip thereby provides a complete record of all the transactions entered in the machine and at the end of any particular period it may be detached from the machine and stored away for future reference. The printing mechanism for printing these items as well as the totals standing upon the totalizer and the totals standing on the special counters comprises a pivoted printing frame formed of two side plates 61 and 62 (Figs. 1 and 6), the lower ends of which are provided with claws 63 overlying the shaft 44. The frames 61 and 62 are connected together by a cross member 64 and shafts and other members which will be referred to hereinafter. Normally, the printing mechanism rests by its own weight in the position shown in the figures with lugs 65 integral with the side frames 61 and 62 contacting with a portion of the frame 22. In this normal position, the printing mechanism is adapted to print the items entered in the machine upon the record strip but it may be rocked downwardly under the control of separate manipulative devices to print from either the totalizer or the special counters as will be more clearly described hereinafter.

Journaled in the printing side frames 61 and 62 is a shaft 66, the extreme left of which has fastened to it a bell crank 661 (Fig. 6) carrying a roller which co-acts with the race of a box cam 662 fast to the shaft 40. As has been mentioned hereinbefore, the shaft 40 is given a complete rotation during each operation of the machine and the rotation of the box cam will rock the shaft 66 to actuate a platen and to feed the record strip and the inking ribbon.

Extending transversely of the printer side frames 61 and 62 is a platen supporting shaft 67 upon which is supported a platen 68 by means of forwarding extending arms 69 and 70 (Fig. 1) secured to the shaft 67. The under face of the platen is provided with a rubber impression block 71 as clearly seen in Fig. 6.

Extending rearwardly from and movable with the right arm 70 is a platen actuating arm 72 attached to which is a block 73 which is actuated by a hammer 74 to force the impression block 71 against type to take an impression.

For actuating the platen 68 to take an imprint, the hammer 74 (Fig. 6) is provided and is formed as part of an arm 79 pivoted to the inside of the right printer side frame 62 by a stud 80. The hammer 74 is normally urged upwardly by means of a spring 81 bearing against a lug 82 carried by the right printer side frame 62. The arm 79 is provided with a spring-pressed retracting pawl 83 having a tail 84 bearing against an adjustable stop 85 passing through a member 86 attached to the arm 79. The pawl 83 has a lug 87 cooperating with a nose 88 formed as part of an arm 89 (Fig. 6), secured to the main printer shaft 66. When the arm 89 is rocked clockwise during an item entering operation as viewed in Fig. 6, by means of the bell crank and the shaft 66 to which the bell crank is secured, the nose 88 will bear against the lug 87 of the pawl and retract the hammer 74 against the tension of the spring 81. Upon a further movement of the arm 89 the nose 88 will clear the lug 87 of the pawl 83 and permit the hammer portion 74 to strike the lug 73 and through the connections heretofore described rock the platen 68 downwardly to effect a printing impression from the adjusted type carriers.

Figure 1:
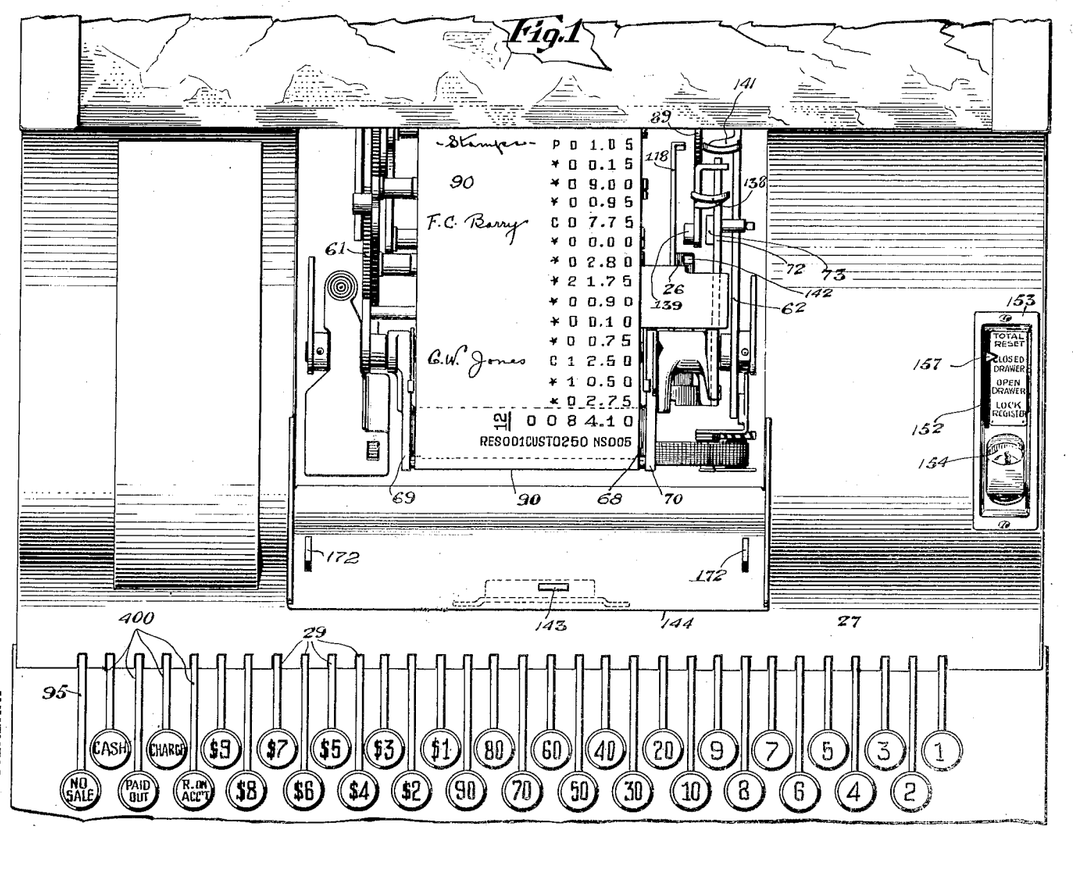
Fig. 1 is a partial plan view with parts of the cabinet removed to show a sample of the detail strip after printing has been effected from the item type carriers totalizer and special counters. This view also shows the general arrangement of the printing levers, the control mechanism, and the operating keys.

The record strip upon which are printed items and totals is best shown in Figs. 1 and 2, the record strip 90 extending from a supply roll 91 around suitable guide rollers 92 and 93, around the platen 68, around other guide rollers, and finally back to a storage roll 94. The details of the record strip, as well as the means for advancing it during an operation of the machine are fully set forth in the before-mentioned Fuller patent and need not be described herein.

Special counters

As shown clearly in Fig. 3, three special counters are provided for registering respectively, the no sale transactions, the number of customers, and the number of resets. Referring to Fig. 3, it will be seen that the no sale key 95 is provided with a laterally projecting pin 99 which operates in a cam slot provided in a cam plate 98 attached to a shaft 100. Also attached to shaft 100 is an arm 101 (Figs. 2 and 3) provided with an open slot 102 (Fig. 2) at the upper end thereof. A pin 103 provided on one arm 105' of counter operating yoke 105 (Fig. 3) relays in the slot 102 aforesaid. Pivotally attached to yoke 105 is a pawl 106 which cooperates with a ratchet 107 as shown in Fig. 3. A spring 108 retains said pawl 106 in engagement with the teeth of ratchet 107. Attached to each ratchet wheel 107 is a pinion 109 which is meshed with an idler gear 110 which, in turn, engages a pinion 111 attached to a corresponding counter wheel 112. The pawl 106 is provided with fingers of different lengths so that carrying from one denominational order to another may be effected.

The general construction of the pawl and ratchet mechanism for actuating counter type carriers 112 is commonly known in the art as the deep notch type. As the construction and operation of this general type of mechanism is well known in the art further discussion thereof is unnecessary. For a complete disclosure of such a mechanism, reference may be had to the patent to Carney No. 876,295. Thus, it is clear that upon depression of the no sale key 95, yoke 105 carrying pawl 106 will be rocked upwardly to actuate the ratchet wheel and consequently the corresponding counter wheel will be actuated one step, and upon return of key 95 to normal position the pawl will assume a position in the notch just below the one previously occupied by said pawl.

Figures 6, 14:
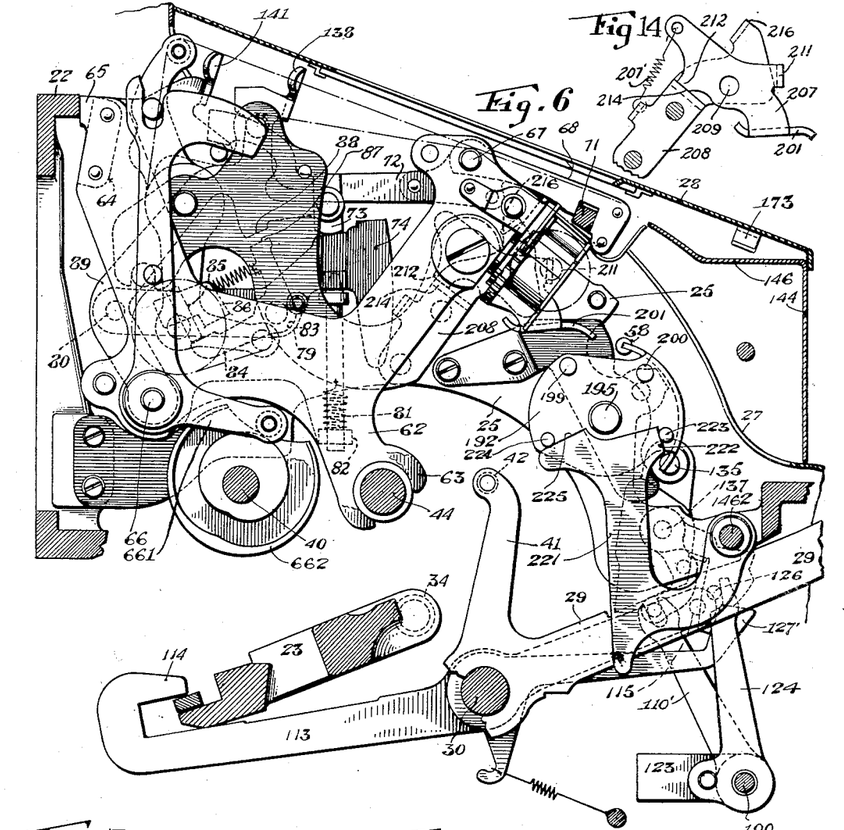
Fig. 6 is a side elevation view showing the printing levers, the interlocking mechanism, and some of the operating elements for the special counters.
Fig. 14 is a detail view showing a portion of the printer frame carrying certain means for actuating the mechanism which compels total printing before printing from the special counters.

The mechanism for operating the customer counter 116 is shown more clearly in Figs. 2, 3 and 6. This mechanism comprises an arm 113 provided with a hook 114 adapted to engage the end of key coupler 33. Arm 113 is loosely pivoted on key supporting shaft 39 and at its forward end carries a laterally projecting pin 96' (Fig. 22) which is adapted to engage in a slot 97' of an arm 98' similar to those shown in connection with the no sale key. A similar arm 113' provided with an open slot at its upper end for receiving a pin on the customer counter operating yoke is also associated with this mechanism. As this mechanism functions in a manner similar to that associated with the no sale key, it is not necessary to repeat the general description thereof. However, it is clear that each time the coupler 33 is operated, arm 113 will be operated and a unit will thus be added in the customer counter.

The operation of the reset counter 117 will now be described. The reset lever 118 is pivotally mounted on shaft 44 and carries a pin 119 attached to the segment 118' thereof. Pin 119, upon operation of the reset lever, is adapted to engage a projection 121 provided on an arm 122 attached to a bail 123 (Fig. 3) journalled on sleeve 403. Also attached to bail 123 is an arm 124 provided with a projection 125 adapted to engage a pin 126 (Figs. 3, 5, and 7), attached to the reset counter actuating yoke 127. Thus, upon movement of the reset lever in a clockwise direction as viewed in Fig. 5, arm 124 will be rocked in a counter-clockwise direction and pawl 128 shown in Fig. 7, will be rocked downwardly to engage a lower notch in ratchet 129'. The reset lever when returned to normal position will restore arm 124 to normal position by means of a projection 129 carried at the lower end of the resetting segment which engages arm 122 when the reset lever is moved in a counter-clockwise direction. Pawl 128 however, will remain in its adjusted position and will not return to normal position when the arm 124 is restored. Pawl 128 is pivotally carried by yoke 127. This yoke is formed with a lip portion 130 adapted to overlie an arm of the customer counter actuating yoke. Thus when the customer counter is operated upon a subsequent operation of the machine, pawl 128 will be restored to normal position and at the same time will actuate ratchet segment 129' one step forward, which movement is transferred to reset counter 117 by a train of connections similar to those shown in connection with the no sale and customer counters. Each of the counters is provided with raised type so that printing impressions may be made upon a record material directly from said counters. A spring urged detent 127' (Fig. 6) is adapted to engage notches 127a and 127b to hold the yoke 127 in either of its positions.

Adjacent the no sale counter is a fixed type carrier 132 carrying the characters "N. S.", designating the no sales operations of the machine.

Adjacent the customer counter is another fixed type carrier 133 carrying the characters "Cust", designating customers.

Also, adjacent the reset counter is a third fixed type carrier 134 carrying the characters "Res", designating the number of resets.

Figures 7, 8:
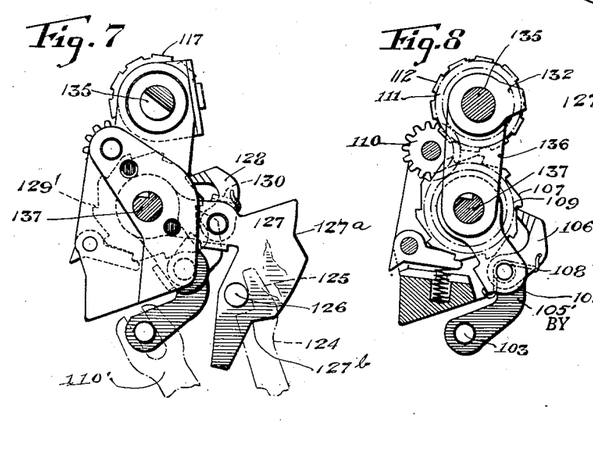
Fig. 7 is a side elevational view of the mechanism for operating the reset counter.
Fig. 8 is a sectional view showing the mechanism for operating the no sale counter.
Figure 9:
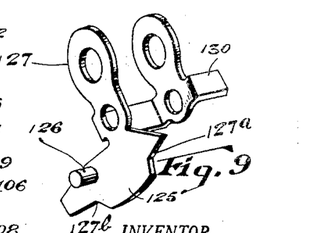
Fig. 9 is a perspective view of the actuating yoke associated with the reset counter.

Each of said special type carriers is mounted on the counter supporting shaft 135, as shown in Figs. 3 and 8. A depending arm 136 attached to the hub portion of each of said special type carriers is apertured so as to embrace shaft 137 supporting each of the special counter operating mechanisms. By this construction it is clear that the said type carriers are held in printing alignment.

Total printing

As has been premised hereinbefore the printer frame is normally in such a position as to print the items entered in the machine upon the record strip but may be rocked downwardly under the control of separate manipulative devices to print either from the totalizer or the special counters by means which will now be described in detail.

In order to take a total from the totalizer all that is necessary is to swing the printer frame until the platen is directly over the totalizer and when the platen is in this position it will automatically be actuated and the total standing on this totalizer printed upon the record strip. To rock the printer frame downwardly in this manner there is provided a manipulative device 138 which is integral with the arm 89 heretofore mentioned. The manipulative device 138 has secured thereto a stud 139 which is adapted to cooperate with a groove 140 formed in an upper extension of the right end supporting frame 26 which, it will be recalled, serves as a support for the totalizer and the item printing wheels as well as the special counters. Thus, when it is desired to take a total from the totalizer, the manipulative device 138 is grasped and by drawing it forward the printer frame will follow and rock about the shaft 44 as a pivotal point while, at the same time, the lever 89 will rock slightly about the shaft 66 and the stud 139 will enter the groove 140. Further movement of the printer frame will, due to the eccentric shape of groove 140 cause further clockwise rotation of shaft 66 to the same extent that the box cam 62 rocks it during the regular operation of the machine. The parts are so proportioned that the printing hammer 74 will be released at substantially the same time that the platen 68 overlies the total printing elements of the totalizer. The end of groove 140 serves to positively stop the forward movement of the printer frame when it is in its proper position to print a total from a totalizer. Whenever a total is printed the record strip will be fed in a manner described in detail in the patent to Fuller 1,742,701 so that after each total printing operation, just as in item printing operations, the record strip will be fed an increment.

In order to obtain a printing impression from the special counters a manipulative device 141 is provided which is integral with the right printer side frame 62. As best shown in Fig. 5, it will be seen that the supporting frame 26 is provided with a second slot 142 longer than the slot 140 previously mentioned and having a different curvature. The stud 139 referred to hereinbefore is adapted also to cooperate with slot 142. When the printer frame is rocked about its pivotal point by means of grasping its manipulative device 141 and drawing it downwardly, the stud 139 will first move in an arc about the shaft 44 as a center and will enter the slot 142 which will subsequently cause a relative turning movement of the shaft 66 in the frame, thereby retracting and releasing the hammer 74 for printing at substantially the time the platen is over the special counters.

In order to cover and conceal the record strip, printing devices, and totalizers, the lid 28 previously referred to is provided. The lid is controlled by a lock 143, shown in Fig. 2, carried by the front portion 144 of the cabinet 27. The key of this lock is usually retained by the clerk operating the machine so that he can raise the lid 28 to obtain access to the paper holding mechanism in order to replenish the supply of paper when it is exhausted. It will be apparent from an inspection of Fig. 2 that the hood 144 just referred to is a stationary part of cabinet 27 being riveted thereto by suitable hinge pieces not shown. It will also be seen that the side plates of the hood conforming with the front of the cabinet afford an added means to better secure said hood if desired. The top portion 145 of the hood 144 affords complete protection for the totalizers and special counters.

Locks for controlling total printing

As shown in Fig. 6, the manipulative devices 138 and 141 for obtaining the printed totals are located under the lid 28 and since the clerks operating the machine have possession of the keys for the lock controlling the release of this lid, an additional lock is preferably provided for preventing unauthorized persons from operating the manipulative devices for securing the printed totals. This lock comprises a rearwardly extending arm 147, Figs. 3 and 10, secured to a shaft 146a, having its end normally in the path of a stud 148 secured to the right printer side frame 62. When the locking arm is in this position it will be impossible to rock the printer frame downwardly to take a total and in order to unlock the printing mechanism to perform total printing there is provided a supplemental lock which has connections to the arm 147 to control it so as to bring it out of engagement with the stud 148. The lock and the connections to the arm 147 will now be described, reference being had particularly to Figs. 4, 5, and 10.

Loosely pivoted upon the segment shaft 44 is a control lever 149 having secured thereto a concentric plate 150 slidable beneath the cabinet 27 of the machine. The plate 150 carries a pointer 151 which is slidable in a slot 152 formed in a plate 153 attached to the machine cabinet, the said plate bearing at the desired places engraved characters and words representing the different controls over the machine, such as "closed drawer" operation, in which the closing of the cash drawer is compelled before the machine can be subsequently operated; "open drawer" operation in which the machine may be operated without necessitating the closing of the cash drawer during successive registering operations; "lock register" condition under which the registering mechanism is entirely locked against operation and the fourth or uppermost position of the pointer may be what is known as "total and reset" position, and when the control lever is adjusted to this position the cabinet lid 28 is unlocked and the machine conditioned for printing totals and resetting the totalizer and counters. Only the mechanism which is appurtenant to the last mentioned position will be described, as the other devices form no part of the present invention and need not be described herein in detail. For further disclosures of the remaining features, reference may be had to the Fuller patent previously mentioned.

Attached to the plate 150 by any desirable means is a lock 154 which projects through a slot in the plate 153. This lock is so constructed that it may be adjusted to move with the lever 149 and secure the same in any of its positions of adjustment. One form of such lock is shown in the Green application and the Fuller patent previously mentioned.

The lever 149 is provided with a rack segment 155 meshing with a gear sector 156 fast to the right-hand end of the key shaft 30. Also secured to this shaft is a somewhat larger gear sector 157 meshing with another gear sector 158 rigidly mounted on a transverse shaft 161 which carries toward the center of the machine a disk 162 formed with a cam slot 163 (Figs. 3 and 5) cooperating with a stud 164 carried by the rearward arm of the bell crank 165.

The upper arm of the bell crank 165 carries a pin 166 cooperating with a cam slot 167 (Figs. 3 and 10) formed in an arm 168 pinned to the shaft 146a carried by the tie bar 23. A spring 169 is connected between the rearward end of the arm 168 and the locking member 147 so that the lower edge of the locking member 147 contacts with a lug 170 formed on the arm 168. The slot 163 formed in the disk 162 is provided with a dwell and a camming portion, the result of this being that if the control lever is moved to any of the three lower positions there would be no effect upon the bell crank 165 or the arm 168. However, when the control lever is moved upwardly to the "total and reset" position the shaft 161 will be rocked sufficiently so that the cam portion of the slot just mentioned will become effective. The result of this is that the cam portion of the slot 167 will cause the arm 168 to be rocked counter clockwise and through the spring connection will permit the lowering of the arm 147 to bring it out of engagement with the stud 148 carried by the right printer side frame.

The printing mechanism is now unlocked for operation, thereby permitting the printing of totals from the totalizer and special counters. Also secured to the shaft 146² to which the locking arm 147 is secured is another locking arm not shown which is adapted to be brought in front of an arm not shown carried by the key coupler 33. It will, therefore, be seen that when the arm 147 is lowered to release the printing mechanism the other locking arm will pass in front of the arm attached to the key coupler, thereby locking the key coupler and the operating keys as long as the printing mechanism is unlocked for total printing operations. This mechanism is fully shown in the Green applications previously mentioned.

It is necessary, of course, before total printing can be accomplished by operation of the various manipulative devices 138 and 161, to unlock the lid 28, previously mentioned. This, of course, can be accomplished by the operation of the lock 143 usually controlled by the clerk, as before described. However, the illustrative embodiment also includes means whereby when the control lever is moved to the "total and reset" position it will also operate the shaft 171 to disengage the hooks 172 from the flanged studs 173 independently of the operation of lock 143. To this end the extreme upward end of the bell crank 165 is provided with a pin 174 cooperating with an extension 175 of one of the lid locking pawls which is fast to the shaft 171, previously mentioned. Rocking of the bell crank 165 by movement of the lever to the "total and reset" position will, therefore, rock the shaft 171 to release the lid 28.

Mechanism is also provided for compelling printing from the totalizer before a printing impression may be taken from the special counters. To this end a lever 176 pivoted at 177 is provided, (Figs. 5 and 10). This lever is mounted in juxtaposition to plate 26 and the rearward end 178 thereof lies adjacent cam slot 142 so that passage of pin 139 on arm 89 through said slot is prevented. However, when printing is effected from the totalizer, the shaft 58 will be shifted by cam 197 in a manner hereinafter described which will bring a peripheral groove 180 provided in the right hand end of shaft 58, as shown in Fig. 11 into registering position with the hook portion 181 of lever 176, thus permitting spring 182 to rock lever 176 in a clockwise direction to bring the arm 178 thereof out of the path of stud 139. The printer frame may now be rocked to effect printing from the special counters.

*Resetting devices*

As has been stated before, the resetting lever 118, as well as the total taking devices, is held in locked position during normal operations of the machine. When the control lever 149 is moved to total and reset position however, both the resetting lever and the total taking devices are released for operation. The mechanism for releasing the resetting lever for operation will now be described.

Referring to Fig. 5 it will be seen that one end of link 183 is pivoted to the resetting lever 118 at 184, the other end of which is bifurcated to receive stud 185 provided in side frame 26. Link 183, is formed with a shoulder 186 which is engaged by a projection 187 of link 188 when the resetting lever is in normal position. Link 188 is pivoted at its lower end to bell crank 165; the upper end thereof being bifurcated so as to slide on shaft 49. Thus it is seen that when the control lever is moved to total and reset position bell crank 165 will be rocked in a counter-clockwise direction thereby moving link 188 downwardly to release the resetting lever for operation. The resetting lever is now free for operation but before resetting of the totalizer and special counters can be effected a printing impression must be taken from both the totalizer and special counters. The mechanism for conditioning the totalizer and counters for resetting will now be described.

As shown in Figs. 3, 5 and 11, pinions 190 and 191, respectively, are pinned to shafts 58 and 137. When the parts are in normal position pinion 190 is out of mesh with segment 118' of the resetting lever, but pinion 191 is always in engagement therewith.

A depending arm 135A is pinned to shaft 135 at the right-hand end thereof. This arm is provided with a bifurcation at its lower end for receiving a hub portion of pinion 191. A pin 135B is provided on arm 135A and is adapted to normally engage in a notch provided in disk 135c (Fig. 11) integral with the hub portion of pinion 191 but arranged in spaced relationship with respect to the pinion. Thus it is seen that the resetting lever is normally locked against operation also by the arm 135A and the connections associated therewith just described. In order to shift shaft 58 so as to bring pinion 190 into engagement with segment 118' and to release segment 118' from locking engagement with arm 135A a disk 192 (Fig. 6) is provided. This disk is pivoted on a stud 195 and is adapted to be rocked in either direction by the total taking devices. Disk 192 is formed with a peripheral flange 196, which is provided with cam faces 197 and 198 for engaging shafts 58 and 135 respectively. A stud 199 is provided on disk 192 and is adapted to be engaged by a curved plate 201 when the printer frame is rocked to effect printing from the totalizer. Plate 201 as shown in Fig. 14 is attached to a rockable member 207 which is pivotally secured at 209 to a bracket 208 which in turn is secured to the printer side frame. A stud 209 is also attached to disk 192 and is adapted to be engaged by a lug 210 formed in bracket 208 when the printer frame is rocked to effect printing from the special counters. A spring, 207', normally retains the pivoted member 207 in the position shown in Fig. 6, by virtue of projection 212 formed on said member 207 which normally engages a shoulder 214 provided on the supporting bracket 208. A projection 211 is also formed in member 207 to prevent excessive movement thereof when the printing mechanism is returned to normal after effecting printing from the special counters. Thus, it is seen that after the machine has been conditioned for a total taking operation by adjusting the control lever to total and reset position the operator may effect printing from the totalizer by simply grasping manipulative device 138 and drawing the same forwardly to bring the platen over the totalizer. Upon taking a total from the totalizer the curved plate 201 will engage stud 199 and thereby rock disk 192 in a counter-clockwise direction (Fig. 6). This movement of the disk will cause the upper cam surface 197 to shift shaft 58 to the right (Fig. 3), bringing groove 180 thereon into registering position with hook portion 181 of lock lever 176 (Figs. 10 and 11), and also bringing pinion 190 into mesh with the resetting segment 118'. Lever 176 will then be rocked in a clockwise direction by a spring 182 and the hook portion of said lever will engage in the groove 180 and thereby hold shaft 58 in shifted position. At the same time, the upper arm 178 of lever 176 will be moved out of the path of stud 139, so that printing may now be effected from the special counters. To take an impression from the special counters, manipulative device 141 is grasped and printer frame 62 is drawn forwardly, as described hereinbefore, to bring the platen 71 over the special counters. As the printer frame is moved in this manner projection 216 will engage stud 200 on disk 192 and will rock the same in a clockwise direction, causing cam surface 198 to engage shaft 135 and shift the same inwardly thereby removing stud 135B from notch 135c to release the pinion 191 and permit movement of resetting segment 118'. Shaft 135 is held in this position by the straight portion of the flange 199 when the printer frame is returned to normal position. Thus it is seen that both shafts 58 and 135, respectively, are held in shifted position and pinions 190 and 191, respectively, are in operative engagement with the teeth of the resetting segment. Upon shifting shaft 58 in the manner aforesaid notches 217 provided thereon are brought into operative relationship with the pick-up pawls 218 provided on each of the totalizer wheels. Shaft 137 is provided with a long notch 219 which cooperates with pick-up pawls 220 on each of the ratchet wheels 127 of the no sale and customer counters, respectively. It will be noted that the left-hand portion of shaft 137, which supports the reset ratchet wheels 129, is not provided with a notch so that the reset counter will not be affected during the resetting operation. To reset the totalizer elements and the customer and no sale counters, the resetting lever 118 is simply drawn forward and returned to normal. During movement of the lever in this direction the shafts 58 and 137 will be rotated and the totalizer and the no sale and customer counters will be restored to zero. The totalizer and counter shafts will remain in shifted position until the control lever 148 has been moved to another position of adjustment. Upon movement of the control lever 149 to one of its other positions of adjustment, lever 221 fast to shaft 1462, shown in Fig. 6, will be moved in a clockwise direction, by the cam 162 (Fig. 2), bell crank 165, stud 166 (Fig. 10), and lever 168 secured to shaft 1462, in the manner heretofore described thereby causing the surface 222 thereof to engage a stud 223 provided on disk 192. Disk 192 will thus be rocked in a counter-clockwise direction until a stud 224 thereon engages surface 225 of lever 221 at which time the disk is in normal position. Upon restoration of disk 192 to normal position cam surface 198 will be moved sufficiently to permit a spring 135' (Fig. 3) to restore shaft 135 to normal position, thereby restoring pin 135B in the notch in disk 135c, thus locking shaft 137 as well as the resetting lever 118 against operation.

The mechanism for releasing shaft 58 is shown more clearly in Figs. 3 and 10. A curved arm 226 rigidly secured to arm 168 previously described, is also adapted to swing about shaft 1462 as a pivot. Therefore, when the control lever is moved out of total and reset position, bell crank 165 will be rocked in a clockwise direction and stud 166 carried by the upper arm thereof operating in cam slot 167, will rock arms 168 and 226 upwardly. Projection 170 on arm 168 will engage arm 147 and restore it to normal position to lock the printer frame 62 against operation. At substantially the same time arm 226 will engage arm 227 of lever 176 and will rock the same in a counter-clockwise direction to remove the hook portion 181 of said lever from groove 180 of shaft 58, and to restore arm 178 to its normal position adjacent cam slot 142 and in the path of stud 139 to prevent printing from the special counters as described heretofore. A spring 58' will then restore shaft 58 to normal position. The machine is now conditioned for item entering operations.

The nature of the improved mechanism is such that in order to make the foregoing description as clear as possible it was necessary to state the operation considerably in detail as an incident to explaining the various features of construction. Therefore, a complete re-statement here of the operation is believed to be unnecessary.

While the form of mechanism herein shown and described is admirably adapted to fulfill the objects primarily stated, it is to be understood that it was not intended to confine the invention to the one form of embodiment herein shown, since it may be embodied in various forms all coming within the scope of the claims which follow.

What is claimed is:

1. In a machine of the class described, a plurality of printing totalizer elements, a customer counter, a no sale counter, a platen, devices for actuating said platen to effect printing from said totalizer elements and counters, means for compelling printing from the totalizer elements before printing may be effected from the counters, and a common means for resetting said totalizer and counters, and means for compelling printing from the counters before the resetting means can be operated.

2. In a machine of the class described, a plurality of printing totalizer elements loosely mounted upon a shaft, a plurality of special counters mounted upon a shaft parallel to said first mentioned shaft, mechanism for printing respectively from said totalizer elements and counters upon a record bearing material, means operated as an incident to an operation of printing from the totalizer elements, for shifting the totalizer shaft to condition the totalizer for resetting, means for holding said shaft in shifted position, means, operated as an incident to an operation of printing from the counter, for actuating said first mentioned means in another direction to shift the shaft supporting the counters to condition said counters for resetting, and means for simultaneously rotating said shafts to restore said counters and totalizer elements to zero.

3. In a machine of the class described, a plurality of printing totalizer elements loosely mounted upon a shaft, a plurality of printing counters mounted on a shaft parallel to said first mentioned shaft, devices for printing respectively from the totalizer elements and counters, a stop member so constructed and arranged as to compel printing from said totalizer elements before printing can be effected from said counters, a rockable member, means for rocking said rockable member in one direction when printing is effected from said totalizer elements thereby shifting the totalizer shaft, means provided on one end of said shaft for receiving a portion of said stop member for holding said shaft in shifted position, additional means for rocking said rockable member in the reverse direction when printing is effected from the counters, common means for resetting said counters and totalizer elements, and control means for restoring said rockable member to normal position and disengaging said stop member from said totalizer shaft, and means for shifting said shafts to normal position.

4. In a machine of the class described, a printing totalizer, a printing special counter, a record bearing material, devices for printing from said totalizer and special counter upon said record bearing material, means for compelling a sequence of operation between said devices, a resetting mechanism for resetting said totalizer and counter, and means compelling printing from said totalizer and counter before resetting thereof can be effected.

5. In a machine of the class described, a printing totalizer, a printing special counter, a record bearing material, devices for printing from said totalizer and counter upon said record bearing material, resetting means for resetting said totalizer and counter, a control member movable to different positions of adjustment, and a plurality of locking devices for said resetting means, one of said locking means being released upon movement of said control lever to one of its positions of adjustment and another of said locking means being released as an incident to printing from said special counter.

6. In a machine of the class described, a printing counter, a shaft supporting said counter, means for printing directly from said counter, actuating means for said counter supported on a shaft parallel to said first mentioned shaft, a resetting segment, a pinion fixed to said last mentioned shaft engaging said segment, means carried by said counter supporting shaft for normally locking said resetting segment, and means operable as an incident to printing from said counter for shifting said counter supporting shaft to release said resetting segment for operation.

7. In a machine of the class described, a printing totalizer, a shaft supporting said totalizer, a resetting segment, a pinion carried by said shaft normally out of engagement with said segment, a printing counter, a shiftable shaft supporting said counter, actuating mechanism for said counter mounted on a third shaft, a pinion fixed to said third shaft normally in engagement with the resetting segment, means for locking said resetting segment, devices for printing from said totalizer and counter, means operated as an incident to printing from said totalizer for bringing said first named pinion into engagement with said segment, and means operated as an incident to printing from said counter for shifting the counter supporting shaft to release the resetting segment for operation.

8. In a machine of the class described, a plurality of printing totalizer elements loosely mounted upon a shaft, a special counter mounted upon a shaft parallel to said first-mentioned shaft, devices for printing respectively from said totalizer elements and counter upon a record bearing material, means, operated as an incident to an operation of printing from the totalizer elements, for shifting the totalizer shaft to condition the totalizer for resetting, means for holding said shaft in shifted position, means, operated as an incident to an operation of printing from the counter, for actuating said first-mentioned means in another direction to shift the shaft supporting the counter to condition said counter for resetting, and means for simultaneously rotating said shafts to restore said counter and totalizer elements to zero.

9. In a machine of the class described, a plurality of printing totalizer elements loosely mounted upon a shaft, a special counter mounted on a shaft parallel to said first-mentioned shaft, devices for printing respectively from the totalizer elements and the counter, a stop member interposed between said devices so constructed and arranged as to compel printing from said totalizer elements before printing can be effected from said counter, a rockable member, means operated as an incident to an operation of printing from the totalizer elements, for rocking said member in one direction, thereby shifting the totalizer shaft, means provided on one end of said shaft for receiving a portion of said stop member for holding said shaft in shifted position, additional means, operated as an incident to an operation of printing from the counter, for rocking said rockable member in the reverse direction, a common means for resetting said counter and totalizer elements, and control means for restoring said rockable member to normal position and disengaging said stop member from said totalizer shaft, and means for shifting said shafts to normal position.

10. In a machine of the class described, a printing totalizer, a shaft supporting said totalizer, a resetting segment, a pinion carried by said shaft normally out of engagement with said segment, a special counter, a shiftable shaft supporting said counter, actuating mechanism for said counter mounted on a shaft, a pinion fixed to said shaft normally in engagement with the resetting segment, means for locking said resetting segment, devices for printing from said totalizer and counter, means operated as an incident to printing from said totalizer for bringing said first-named pinion into engagement with said segment, and means operated as an incident to printing from said counter for shifting the counter supporting shaft to release the resetting segment for operation.

11. In a device of the class described, a totalizer; a special counter, a resetting segment in engagement with said special counter; means for locking said segment; means for printing from said totalizer and from said counter; means whereby a printing operation on said totalizer engages it with said segment; means whereby a printing operation on said counter unlocks said segment; and means compelling a printing operation on said totalizer before a printing operation can be performed on said counter.

12. In a device of the class described, a totalizer, a special counter; a resetting segment, means for printing from said totalizer and from said counter; means compelling a predetermined sequence between printing from said totalizer and from said counter; means for locking said resetting segment; means operable as an incident to total printing for connecting said totalizer with said resetting segment, and means operable as an incident to printing from said counter for unlocking said resetting segment.

13. In a device of the class described, a printing totalizer and a printing counter; a platen movable to a cooperative position over either; means preventing movement of said platen to its position over said counter; and means responsive to the movement of the platen to its position over said totalizer for disabling said preventing means.

14. In a device of the class described, a printing totalizer and a printing counter; a resetting means normally disengaged from said totalizer and constantly engaged with said counter; means for locking said resetting means; a platen movable to a cooperative position over either said totalizer or said counter; means responsive to movement of said platen to its position over said totalizer for engaging said totalizer with said resetting means; and means responsive to movement of said platen to its position over said counter for disabling said locking means.

15. In a machine of the class described, a shiftable shaft, a counter mounted on said shaft, normally locked resetting means for said counter, means whereby the resetting means is unlocked when the shaft is shifted, means for printing from said counter, and means operable as an incident to an operation of said printing means to shift the shaft.

CHARLES W. GREEN.